United States Patent

[11] 3,601,682

| [72] | Inventors | Masahiko Iwata;<br>Hirosuke Imabayashi, both of Ise, Japan |
|---|---|---|
| [21] | Appl. No. | 41,893 |
| [22] | Filed | June 1, 1970 |
| [45] | Patented | Aug. 24, 1971 |
| [73] | Assignee | Shinko Electric Co., Ltd.<br>Tokyo, Japan |
| [32] | Priority | June 10, 1969 |
| [33] | | Japan |
| [31] | | 44/46006 |

[54] STATIC INVERTER FOR ENSURING SMOOTH SUPPLY OF POWER FOR LEADING AND LAGGING LOAD CURRENTS
3 Claims, 4 Drawing Figs.

[52] U.S. Cl. .............................................. 321/21,
321/45 R, 331/113 R
[51] Int. Cl. ..................................................... H02m 7/48
[50] Field of Search ........................................... 321/18, 21,
45, 36; 331/113.1

[56] References Cited
UNITED STATES PATENTS

| 3,289,098 | 11/1966 | Cannalte ...................... | 331/113 X |
| 3,305,756 | 2/1967 | Doss et al. .................... | 331/113 (.1) X |
| 3,366,867 | 1/1968 | Dodge .......................... | 321/45 |
| 3,369,195 | 2/1968 | Zollinger et al. ............... | 331/113 (.1) |
| 3,387,228 | 6/1968 | Randall ........................ | 331/113 (.1) |
| 3,388,309 | 6/1968 | Banks et al. .................. | 331/113 (.1) X |
| 3,401,327 | 9/1968 | Leppert......................... | 321/45 X |
| 3,500,168 | 3/1970 | Merritt ......................... | 321/21 X |

*Primary Examiner*—William M. Shoop, Jr.
*Attorney*—Kurt Kelman

ABSTRACT: A stationary inverter having a DC power source and a transformer. Input power is applied from the source alternatingly to either half of the primary winding of the transformer through a first and a second controlled switching circuits, respectively. Diodes are used in the switching circuits for ensuring smooth supply of power for leading and lagging load currents.

INVENTORS
MASAHIKO IWATA
HIROSUKE IMABAYA
BY Kurt Kelman
AGENT 3,601,682

STATIC INVERTER FOR ENSURING SMOOTH SUPPLY OF POWER FOR LEADING AND LAGGING LOAD CURRENTS

BACKGROUND OF THE INVENTION

This invention relates to a stationary inverter, and more particularly to a controllable stationary inverter of simple construction.

There have been a number of stationary inverters proposed heretofore, which use transistors and thyristors. Many of simple inverters, which have been proposed heretofore, are merely for the generation of an AC output power by using suitable means such as the Royer oscillator, and the effective value of the output power cannot be controlled. Those known inverters which include a means for the control of the effective value of the output power have a complicated circuit construction. Furthermore, there have not been any satisfactory stationary inverters which can be controlled in response to variation or fluctuation in the power factor of loads.

Therefore, an object of the present invention is to provide a stationary inverter of very simple construction and being capable of controlling the effective value of its output, while ensuring stable operation even when the power factor of the load fluctuates.

Other objects and advantages of the present invention may be appreciated by referring to the following description, taken in conjunction with the accompanying drawings.

SUMMARY OF THE INVENTION

In accordance with the present invention an improved stationary inverter is provided which comprises a stationary inverter comprising DC power source, a transformer having a primary winding a secondary winding, a first controlled switching element having one terminal connected to the middle point of the primary winding of the transformer through the DC power source, a second controlled switching element and a third controlled switching element being inserted between the opposite terminal of the first switching element and the second switching element, a second diode connected across another series-connected circuit consisting of the first switching element and the third switching element, and a third diode connected between the middle point of the primary winding of the transformer and the common joint of the second switching element and the third switching element.

BRIEF DESCRIPTION OF THE DRAWINGS

Like parts and components are designated by like symbols throughout the drawings.

DESCRIPTION OF THE PREFERRED EMBODIMENTS

Figure 1:
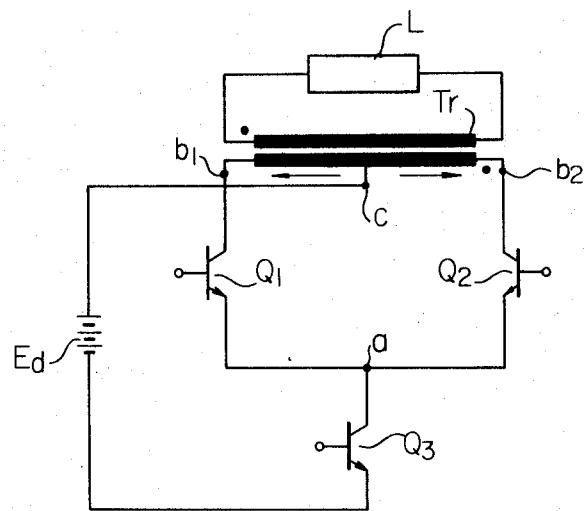
FIG. 1 is a schematic circuit diagram of a stationary inverter, according to the present invention.

In FIG. 1, illustrating the principles of the present invention, the primary winding of a transformer Tr and transistors $Q_1$, $Q_2$, and $Q_3$ are connected to a DC power source $E_d$, and a load L is connected to the secondary winding of the transformer Tr. The input control signals to the bases of the transistors $Q_1$ and $Q_2$ are periodically switched over with a constant period T (FIG. 4), in an alternating fashion. The emitters of the two transistors $Q_1$ and $Q_2$ are joined together at a common joint $a$. The collectors of the two transistors $Q_1$ and $Q_2$ are connected to opposite terminals $b_1$ and $b_2$ of the primary winding of the transformer Tr. A third transistor $Q_3$ is controlled in synchronism with the transistors $Q_1$ and $Q_2$ for regulating the duration of current passage therethrough. The transistor $Q_3$ has its collector connected to the common joint $a$ of the emitters of transistors $Q_1$, $Q_2$, and its emitter connected to the DC power source $E_d$. The opposite end of the DC power source $E_d$ is connected to the middle point terminal $c$ of the primary winding of the transformer Tr.

In the circuit of FIG. 1, the synchronized control of the transistors $Q_1$, $Q_2$, and $Q_3$ is such that when the transistor $Q_1$ is conductive, the transistor $Q_3$ is also made conductive, and when the transistor $Q_2$ is conductive the transistor $Q_3$ is made conductive too. Thus, when both the transistors $Q_1$ and $Q_3$ are simultaneously conductive, there is formed a closed circuit, which traces from the DC power source $E_d$, through the terminals $b_1$ and $c$ of the transformer primary winding, the transistor $Q_1$, and the transistor $Q_3$, and back to the DC power source $E_d$. Accordingly, that portion of the primary winding of the transformer Tr, which is between the terminals $b_1$ and $c$, carries an electric current flowing in the direction, as shown by the solid arrow of FIG. 1. Similarly, when both the transistors $Q_2$ and $Q_3$ are simultaneously conductive, another electric circuit is completed which traces from the DC power source $E_d$, through that portion of the primary winding of the transformer Tr that is between the terminals $b_2$ and $c$, and the transistors $Q_2$ and $Q_3$, and back to the DC power source $E_d$, so that the aforesaid portion $b_2$–$c$ of the primary winding of the transformer Tr carries an electric current flowing in the direction, as shown by the solid arrow of FIG. 1. In response to the alternating conduction at the transistors $Q_1$ and $Q_2$, an alternating voltage V is generated across the secondary winding of the transformer Tr, as shown by the portion A of FIG. 4.

The third transistor $Q_3$ is inserted between the DC power source $E_d$ and the two transistors $Q_1$, $Q_2$, so that the aforesaid two closed circuits cannot be completed unless the transistor $Q_3$ is made conductive, even if the transistors $Q_1$ and $Q_2$ are conductive. Based on this relation, the effective value of the output power, e.g., the r.m.s. value of the voltage across the secondary winding of the transformer Tr, can be controlled. For instance, referring to the portion B of FIG. 4, the beginning of the conduction of the third transistor $Q_3$ may be delayed from that of the transistors $Q_1$ and $Q_2$ by $H_o/2$, while terminating the conduction of the third transistor $Q_3$ earlier than the end of conduction through the transistors $Q_1$ and $Q_2$ by $H_o/2$. More particularly, the effective value of the output of the inverter can be controlled by regulating the conducting period $T_o$ and nonconducting period $H_o$ (to be referred to as "quiescent time" hereinafter) of the third transistor $Q_3$.

Figure 4:
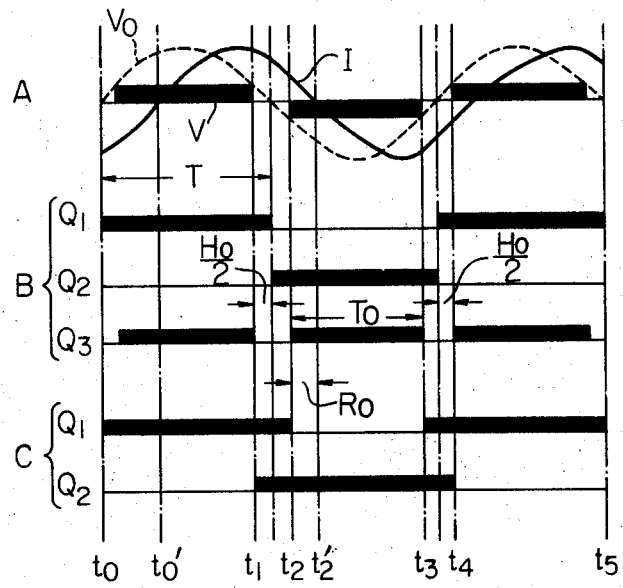
FIG. 4 is a diagrammatic illustration of the manner in which the inverter of the invention operates.

When the power factor of a load is not unity, for instance, if the load takes a lagging current, the load current I is not in phase with the fundamental component $V_o$ of the output voltage from the inverter. The portion A of FIG. 4 illustrates a lagging load current I, together with the fundamental component $V_o$ of the output voltage from the inverter of FIG. 1. With the circuit of FIG. 1, it is impossible to feed such lagging load current I during the quiescent time ($H_o$) (in FIG. 4, between $t_1$ and $t_2$, and between $t_3$ and $t_4$) and during the periods ($R_o$) in which the load current I is of opposite polarity to that of the output voltage (for simplicity's sake, the fundamental component $V_o$, in FIG. 4, and between $t_o$ and $t'_o$, and between $t_2$ and $t'_2$). Accordingly, the circuit of FIG. 1 is not suitable for driving those loads whose power factor is not unit, such as induction motors.

Figure 2:
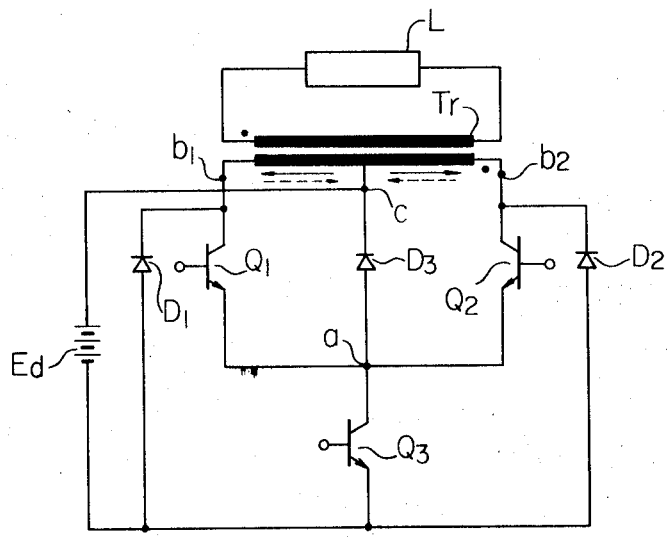
FIGS. 2 and 3 are schematic circuit diagrams of different embodiments of the inverter of the present invention.
Figure 3:
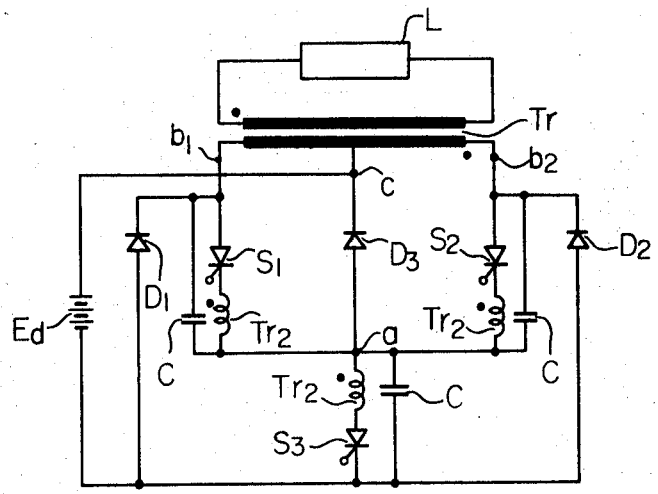

FIG. 2 shows an embodiment of the present invention, which mitigates the last mentioned difficulties. The circuit of FIG. 2 includes diodes $D_1$, $D_2$, and $D_3$ in addition to the circuit of FIG. 1. Except such diodes, the circuit of FIG. 2 is essentially identical with that of FIG. 1. The diode $D_3$ is to allow a primary current to flow through the primary winding of a transformer Tr during the quiescent time ($H_o$), in response to a leading or lagging load current. Such diode $D_3$ is connected between the middle point terminal $c$ of the primary winding of the transformer Tr and the common joint $a$ of two transistors $Q_1$ and $Q_2$, in the polarity as shown in FIG. 3. The other diodes $D_1$ and $D_2$ are to allow a primary current to flow through the primary winding of the transformer Tr during periods ($R_o$) when the polarity of the load current opposes that of the output voltage across the secondary winding of the transformer Tr. Such diodes $D_1$ and $D_2$ are inserted between the negative voltage terminal of DC power source $E_d$ and the opposite terminals $b_1$ and $b_2$ of the primary winding of the transformer Tr, respectively.

With the circuit of FIG. 2, the transistors $Q_1$ and $Q_2$ are made conductive not only during the same periods as those of FIG. 1, but also during the aforesaid quiescent times, as shown in the portion C of FIG. 4. During the quiescent times, both the transistors $Q_1$ and $Q_2$ are simultaneously conductive. Thus, during the quiescent time $t_1$ to $t_2$, a closed circuit is completed which traces from the diode $D_3$, through the portion $c-b_1$ of the transformer primary winding and the transistor $Q_1$, and back to the diode $D_3$. Similarly, during the quiescent time $t_3$ to $t_4$, another closed circuit is completed, which traces from the diode $D_3$, through the portion $c-b_2$ of the transformer primary winding and the transistor $Q_2$, and back to the diode $D_3$. In other words, the portions $c-b_1$ and $c-b_2$ of the transformer primary winding are short-circuited during the quiescent times $t_1-t_2$ and $t_3-t_4$, respectively. Accordingly, during such quiescent times, primary currents flow through the respective portions of the primary windings, as shown by dotted arrows of FIG. 2, but the voltage across the secondary winding of the transformer Tr is kept zero.

In FIG. 4, the load current flows in opposition to the output voltage across the secondary winding of the transformer Tr during the periods $t_o-t'_o$ and $t_2t-_2$, respectively. During the period $t_o-t'_o$, a closed circuit is completed which traces from the diode $D_1$, through the DC power source $E_d$ and the portion $c-b_1$ of the transformer primary winding, and back to the diode $D_1$. Similarly, during such periods $t_2-t'_2$, another closed circuit is completed which traces from the diode $D_2$, through the DC power source $E_d$ and the portion $c-b_2$ of the transformer primary winding, and back to the diode $D_2$. Accordingly, during such periods $t_o-t'_o$ and $t_2-t'_2$, primary currents flows through the portions $c-b_1$ and $c-b_2$ of the transformer primary winding in response to the load current, respectively. Thus, the aforesaid portions of the primary winding of the transformer Tr are neither short-circuited nor opened during the aforesaid periods $t_o-t'_o$ and $t_2-t'_2$, but active voltage of the power source $E_d$ is applied thereto through the diodes $D_1$ and $D_2$, respectively.

Thus, with the circuit construction of FIG. 2, the flow of a continuous primary current is ensured through the transformer Tr for both leading and lagging load currents, so that the inverter can operate in a stable manner even when the load fluctuates.

In the circuits of FIGS. 1 and 2, transistors $Q_1$, $Q_2$ and $Q_3$ are used as electronic switching elements. The invention, however, is not restricted to such switching elements, but other suitable switching elements, such as thyristors, can also be used in lieu of the transistors. It is apparent to those skilled in the art that due care should be taken to the commutation in the case of thyristors. FIG. 3 illustrates another embodiment of the present invention. In the figure, $S_1$, $S_2$, and $S_3$ designate thyristors, each of which is accompanied with a commutation capacitor C and a commutation reactor $Tr_2$, respectively.

As described in the foregoing disclosure, in the inverter of the present invention, a DC power source is inserted between the middle point of the primary winding of a transformer and a first controlled switching element, and a second controlled switching element and a third controlled switching element are inserted between the first switching element and the opposite ends of the primary winding of the transformer respectively. An AC output can be delivered to the secondary winding of the transformer by alternatingly conducting the second and the third switching elements while conducting the first switching element in synchronism with the second and third switching elements. The effective value of the output from the inverter can be controlled by regulating the conducting period, or quiescent period, of the first switching element, while keeping a constant conducting period at the first and second switching elements, because the input DC voltage to the primary winding of the transformer is fed either through the first and second switching elements or through the first and third switching elements.

With the inverter of the present invention, it is also possible to connect a first diode in parallel to a series-connected circuit consisting of the first switching element and the second switching element, while connecting a second diode in parallel to another series-connected circuit consisting of the first switching element and the third switching element, so that a primary current in response to a load current opposing the polarity of the output voltage can flow through the primary winding of the transformer when either of the aforesaid two series-connected circuits is conductive, without interrupting the application of the input DC voltage to the primary winding of the transformer. Furthermore, a third diode can be inserted between the middle point of the primary winding of the transformer and the common joint of the second and third switching elements, so that a primary current corresponding to a leading or lagging load current can flow through the primary winding of the transformer while diminishing the secondary output by conducting either second or third switching element, even when the first switching element is blocked.

Therefore, according to the present invention, an inverter of simple construction is provided, which comprises only three switching elements, three diodes, and a transformer, despite the simplicity of the construction, the inverter of the invention can readily control the effective value of the output power, and a primary current can be maintained for all kinds of load currents, leading or lagging. Therefore, stable operation can be ensured for different kinds of load and load fluctuations.

Although the present invention has been described with a certain degree of particularity, it is understood that the present description has been made only by way of example and that numerous changes in the details of construction and the combination and arrangement of parts may be resorted to without departing from the spirit and the scope of the invention as hereinafter claimed.

What we claim is:

1. A stationary inverter comprising a DC power source, a transformer having a primary winding a secondary winding, a first controlled switching element having one terminal connected to the middle point of the primary winding of the transformer through the DC power source, a second controlled switching element and a third controlled switching element being inserted between the opposite terminal of the first switching element and opposite ends of the primary winding of the transformer, respectively, a first diode connected across a series-connected circuit consisting of the first switching element and the second switching element, a second diode connected across another series-connected circuit consisting of the first switching element and the third switching element, and a third diode connected between the middle point of the primary winding of the transformer and the common joint of the second switching element and the third switching element.

2. A stationary inverter according to claim 1, wherein said controlled switching elements are all transistors, and said one terminal of the first switching element is an emitter thereof and the opposite terminal is a collector thereof.

3. A stationary inverter according to claim 1, wherein said controlled switching elements are all thyristors.